(12) United States Patent
White (10) Patent No.: US 6,729,587 B1
(45) Date of Patent: May 4, 2004

(54) COMMUNICATION CABLE SUPPORT FOR DROP CEILING

(75) Inventor: Isaac D. M. White, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/159,092

(22) Filed: May 31, 2002

(51) Int. Cl.[7] .............. F16L 3/24; H02G 7/00
(52) U.S. Cl. .......... 248/72; 248/68.1; 248/74.2; 248/228.6; 248/231.71; 174/40 R; 174/153 G
(58) Field of Search ............ 248/228.6, 229.15, 248/229.25, 230.6, 231.71, 72, 73, 74.1, 58, 61, 62, 63, 68.1, 65, 74.2; 174/40 R, 40 CC, 153 G; D8/356; 16/2.1

(56) References Cited

U.S. PATENT DOCUMENTS

| | | | | |
|---|---|---|---|---|
| 2,397,749 A | * | 4/1946 | Mendelson | 248/410 |
| 2,593,130 A | * | 4/1952 | Flynn | 174/154 |
| 2,689,995 A | * | 9/1954 | Smith | 285/61 |
| 3,734,436 A | | 5/1973 | Liberman | 248/58 |
| 4,327,887 A | * | 5/1982 | Kumakura | 248/73 |
| 4,371,137 A | * | 2/1983 | Anscher | 248/73 |
| 4,637,097 A | * | 1/1987 | Secord | 24/16 PB |
| 4,854,546 A | | 8/1989 | Vea | 254/134.3 R |
| 4,879,435 A | | 11/1989 | Domigan | 174/48 |
| 4,970,921 A | | 11/1990 | Fagan | 81/121.1 |
| 5,050,273 A | | 9/1991 | Okura | 241/1.36 R |
| 5,085,393 A | | 2/1992 | Ryan | 248/343 |
| 5,316,244 A | | 5/1994 | Zetena | 248/49 |
| 5,383,741 A | | 1/1995 | Vance | 403/383 |
| 5,385,321 A | * | 1/1995 | Kume et al. | 248/74.3 |
| 5,388,790 A | | 2/1995 | Guthke | 248/58 |
| 5,435,514 A | | 7/1995 | Kerr | 248/343 |
| 5,443,232 A | * | 8/1995 | Kesinger et al. | 248/62 |
| 5,667,181 A | | 9/1997 | van Leeuwen | 248/343 |
| 5,740,994 A | | 4/1998 | Laughlin | 248/68.1 |
| 5,873,556 A | | 2/1999 | Reiker | 248/323 |
| 5,957,416 A | | 9/1999 | Sellati | 248/61 |
| 5,971,508 A | | 10/1999 | Deiman | 312/223.6 |
| 6,043,433 A | * | 3/2000 | Schweitzer, Jr. | 174/70 OR |
| 6,053,457 A | | 4/2000 | Ozga | 248/58 |
| 6,056,245 A | | 5/2000 | White | 248/58 |
| 6,102,550 A | | 8/2000 | Edwards | 364/221 |
| 6,112,483 A | | 9/2000 | Murray | 521/220.6 |
| 6,332,594 B2 | | 12/2001 | Shelton | 248/65 |
| 6,341,466 B1 | | 1/2002 | Kehoe | 52/712 |
| 6,345,800 B1 | | 2/2002 | Herst | 248/342 |
| 6,361,000 B1 | | 3/2002 | Jette | 248/49 |
| 6,364,255 B1 | | 4/2002 | Carrick | 248/49 |
| 6,431,502 B1 | * | 8/2002 | Goodman | 248/74.1 |
| 2002/0088906 A1 | * | 7/2002 | Nothofer et al. | |
| 2002/0171013 A1 | * | 11/2002 | Nicolia et al. | |

* cited by examiner

Primary Examiner—Ramon O. Ramirez
Assistant Examiner—Jon Szumny
(74) Attorney, Agent, or Firm—Walters & Zimmerman; Geoff Sutcliffe; Todd Mitchem (57) ABSTRACT

An apparatus for routing a communication cable within a drop ceiling. The apparatus has a main body having an eyelet at one end. A grommet is disposed within the eyelet, and the grommet has at least one passage through which the communication cable passes. The apparatus also has means for securing the apparatus to a framework of the drop ceiling. The passage in the grommet reduces deformation of the communication cable during installation and helps maintain a desired routing of the communication cable once installed within the drop ceiling.

3 Claims, 12 Drawing Sheets

COMMUNICATION CABLE SUPPORT FOR DROP CEILING

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to supports for communication cables and, more particularly, to adjustable supports for multiple communication cables.

2. Description of the Related Art

Communication cables must be supported for optimum signal propagation. Communication cables, such as telephone wires, telephone cables, CAT 3, 5, and 7 voice/data communication cables, and fiber optic cables, must be routed and supported according to the Building Telecommunications Wiring Standard ANSI/TIA/EIA-568A. If the communication cable is not appropriately routed and supported, the communication cable deforms. When the communication cable deforms, such as by sagging, by kinking, and by excessively bending, this deformation may damage the communication cable and may degrade the propagation of signals along the communication cable.

Deformation of communication cables is especially acute within drop ceilings. A drop ceiling has several crossbars, such as "T"-bars, suspended from roof trusses. The crossbars are arranged in a grid and form a framework for the drop ceiling. The framework then supports ceiling panels. Communication cables are usually strung within the framework and lay atop the ceiling panels. When the ceiling panels are removed, the communication cables are often disturbed and their routing is changed. Even if the communication cables are tied to the framework, the sharp edges and corners of the thin-gauge crossbars kink the communication cables. The sharp edges also cut the outer insulation of the communication cables and, over time, signal propagation degrades.

There is, accordingly, a need for an apparatus that routes communication cables within a drop ceiling, an apparatus that is quick and is easy to install within the drop ceiling, and an apparatus that has differing orientations to accommodate varying routing alternatives.

BRIEF SUMMARY OF THE INVENTION

The aforementioned problems are reduced by an apparatus for routing a communication cable within a drop ceiling. This invention allows a technician to quickly and to easily route and install communication cables within the framework of the drop ceiling. The technician first determines the desired routing of the communication cable within the framework of the drop ceiling. The technician then clamps this invention to the framework at one or more desired locations. The technician inserts the communication cable into and through this invention, and this invention helps maintain the desired routing of the communication cable. This invention also reduces deformation of the communication cable and maintains optimum signal propagation along the communication cable.

One embodiment of this invention describes an apparatus for routing a communication cable within a drop ceiling. The apparatus includes a main body having a first end, a second end, and a longitudinal axis. The main body also has an eyelet at the first end, and the eyelet defines a lateral axis for the eyelet. A grommet is disposed within the eyelet. The grommet has a first side surface and an opposite second side surface, with the first side surface and the second side surface perpendicular to the lateral axis of the eyelet. The grommet also has at least one passage through which the communication cable passes. The passage extends to the second side surface, and the passage is bound by an inner wall in an inter grommet. The apparatus also includes means for securing the apparatus to a framework drop ceiling. The passage in the grommet reduces deformation of the communication cable during installation within the drop ceiling. The passage in the grommet also helps maintain a desired routing of the communication cable once installed within the drop ceiling.

Another embodiment describes an alternative apparatus for routing a communication cable within a drop ceiling. This alternative apparatus has a main body having a first end, a second end, and a longitudinal axis. The main body also has an eyelet at the first end, and the eyelet defines a lateral axis for the eyelet. A grommet is disposed within the eyelet, and the grommet has a first side surface and an opposite second side surface. The first side surface and the second side surface are perpendicular to the lateral axis of the eyelet. The grommet also has a bore through which at least one communication cable passes. The bore extends from the first side surface to the second side surface, and the bore includes means for retaining a position of the communication cable within the bore. The apparatus also has means for securing the apparatus to the framework of the drop ceiling. The communication cable passes through the bore in the grommet, and the means for retaining the position of the communication cable helps maintain a desired routing of the communication cable once routed through the bore.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention allows a technician to quickly and to easily route communication cables within the framework of a drop ceiling. Once the technician determines the desired routing of the communication cable within the drop ceiling, this invention clamps to the framework at one or more desired locations. The technician inserts the communication cable into and through this invention, and this invention supports the communication cable and helps maintain the desired routing of the communication cable. Because this invention maintains the desired routing, this invention also reduces deformation of the communication cable. This invention also has adjustable features, so the invention can accommodate various routing options within the drop ceiling. This invention thus allows easier and faster installation of communication cables, and this invention helps maintain propagation of signals along the communication cables.

Figure 1:
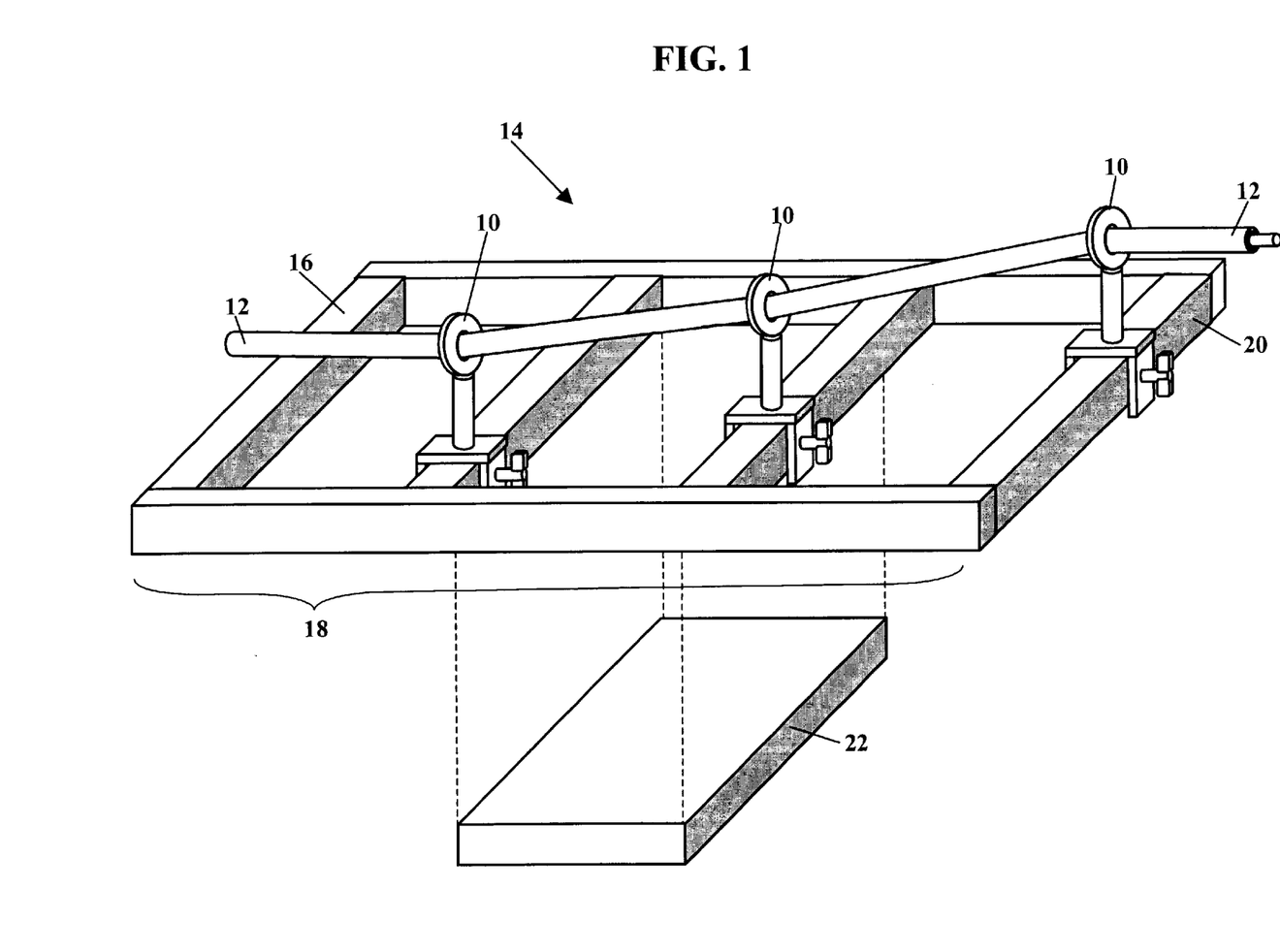
FIG. 1 is a schematic illustrating an operating environment for this invention.

FIG. 1 is a schematic illustrating an operating environment for this invention. FIG. 1 shows an apparatus 10 routing a communication cable 12 through a drop ceiling 14. The drop ceiling 14 has several crossbars 16, such as "T"-bars, arranged in a grid 18 and forming a framework 20 for the drop ceiling 14. The crossbars 16 are suspended from roof trusses (not shown) and support ceiling panels 22. The apparatus 10 helps reduce crimping and kinking as the communication cable 12 is routed through the drop ceiling 14. The apparatus 10 also helps ensure any radius of curvature of the communication cable 12 meets the Building Telecommunications Wiring Standard ANSI/TIA/EIA-568A.

Figure 2:
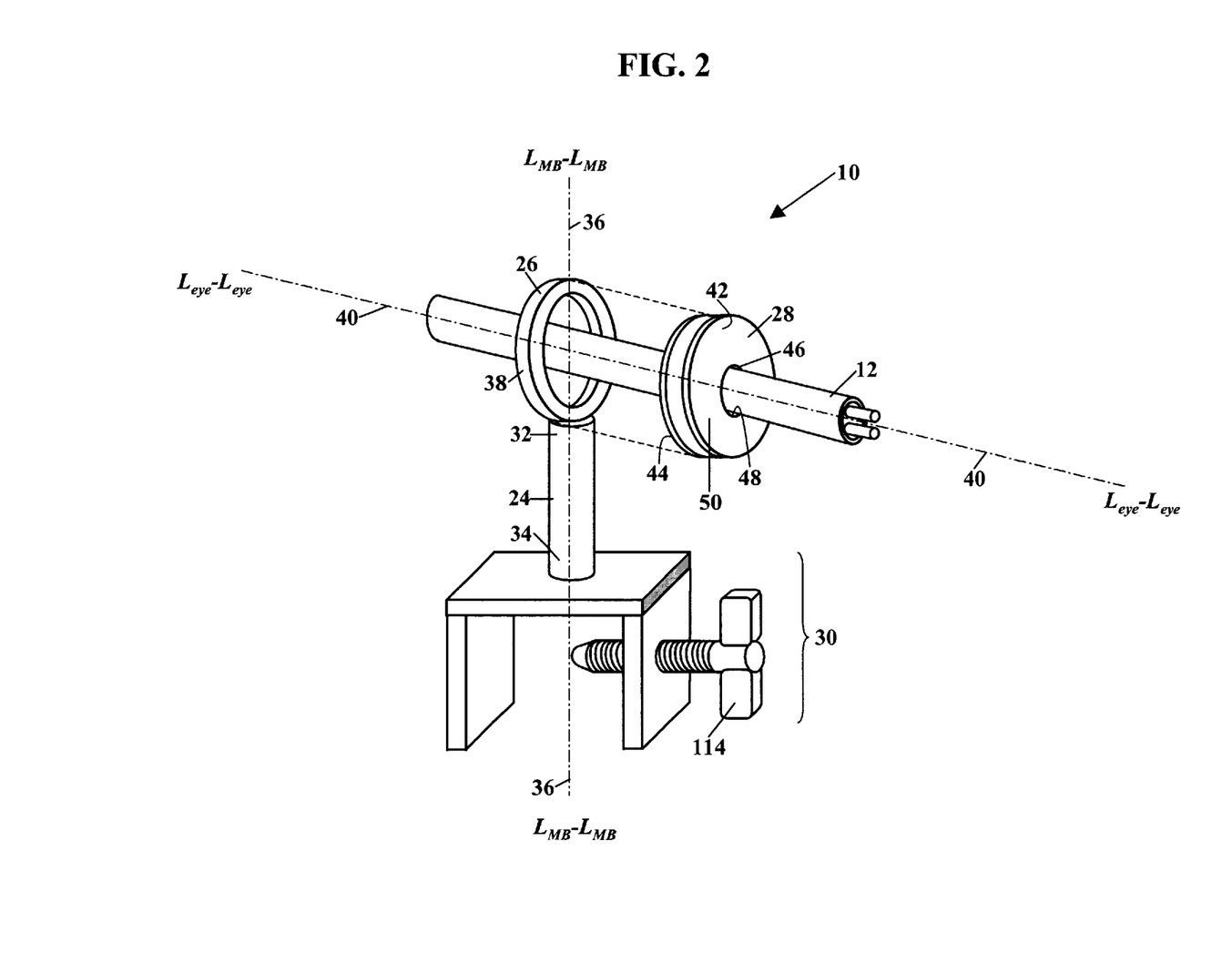
FIG. 2 is an exploded isometric view of an apparatus for routing a communication cable.

FIG. 2 is an exploded isometric view of the apparatus 10 for routing the communication cable 12. The apparatus 10 has a main body 24, an eyelet 26, a grommet 28, and means 30 for securing the apparatus to the framework of the drop ceiling (shown, respectively, as reference numerals 20 and 14 in FIG. 1). The main body 24 has a first end 32, a second end 34, and a longitudinal axis $L_{MB}$—$L_{MB}$ (shown as reference numeral 36). The eyelet 26 extends from the first end 32 of the main body 24, and a rim 38 of the eyelet 26 defines a lateral axis 40 for the eyelet 26. The grommet 28 is disposed within the eyelet 26, and the grommet 28 has a first side surface 42 and an opposite second side surface 44. The first side surface 42 and the second side surface 44 are each perpendicular to the lateral axis 40 of the eyelet 26. As FIG. 2 shows, the grommet 28 also has at least one passage 46 through which the communication cable 12 passes. The passage 46 extends from the first side surface 42 to the second side surface 44, and the passage 46 is bound by an inner wall 48 in an interior region 50 of the grommet 28. The passage 46 in the grommet 28 reduces deformation of the communication cable 12 during installation. The passage 46 also helps maintain a desired routing of the communication cable 12 once the communication cable 12 is installed within the framework of the drop ceiling.

Figure 3A:
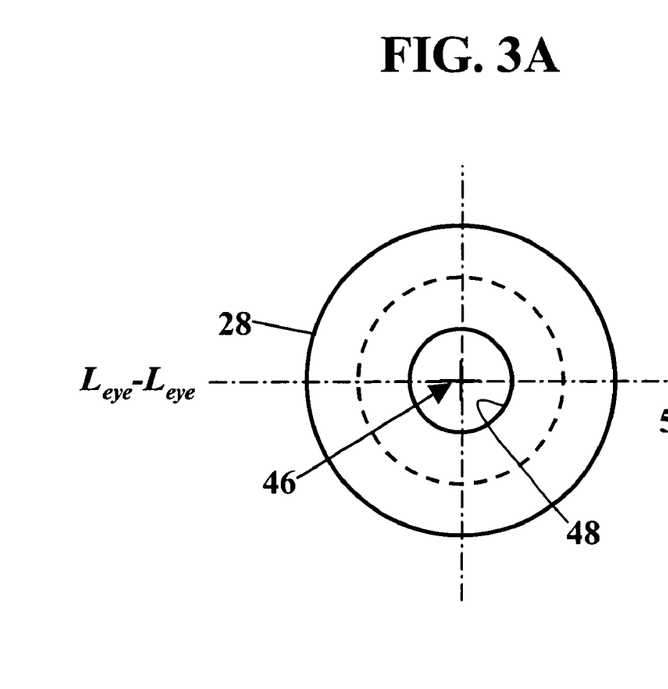
FIGS. 3A and 3B are, respectively, orthographic front and side views of a grommet shown in FIG. 2.
Figure 3B:
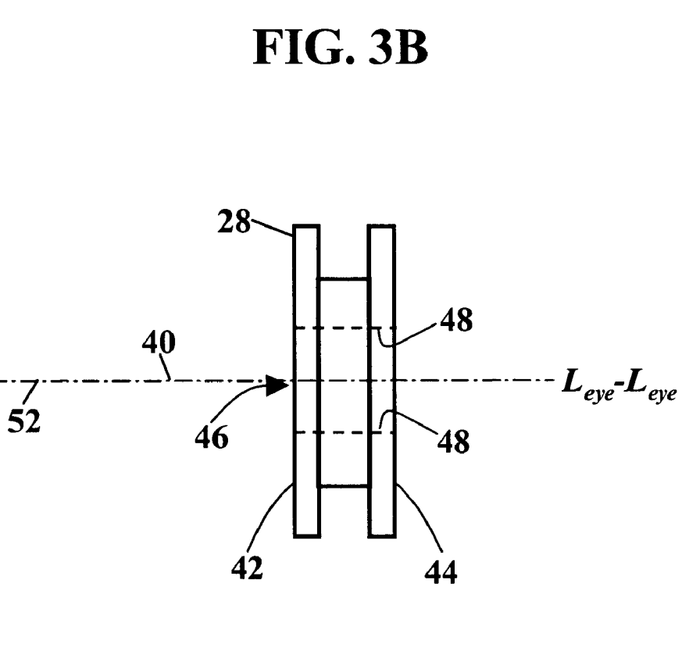

FIGS. 3A and 3B are, respectively, orthographic front and side views of the grommet 28 shown in FIG. 2. The grommet 28 shown in FIGS. 3A and 3B is molded or press-fit into the eyelet (shown as reference numeral 26 in FIG. 2). The at least one passage 46 extends from the first side surface 42 to the second side surface 44, and the at least one passage 46 is bound by an inner wall 48. FIG. 3A shows the at least one passage 46 is centrally located in the grommet 28 such that the inner wall 48 of the passage 46 defines the lateral axis 40 of the eyelet. The inner wall 48 of the passage 46 defines a passage axis 52. Because the at least one passage 46 is centrally located in the grommet 28, FIGS. 3A and 3B show the lateral axis 40 of the eyelet coaxial with the passage axis 52. The diameter of the at least one passage 46 is approximately the same diameter as the communication cable (shown as reference numeral 12 in FIG. 2). The at least one passage 46 would preferably have slightly smaller diameter than the communication cable to reduce sliding of the communication cable within the passage 46. If the communication cable snuggly fits within the passage 46, deformation of the communication cable is reduced. A snug fit also helps maintain the desired routing of the communication cable once the communication cable is installed within the framework of the drop ceiling.

Figure 4A:
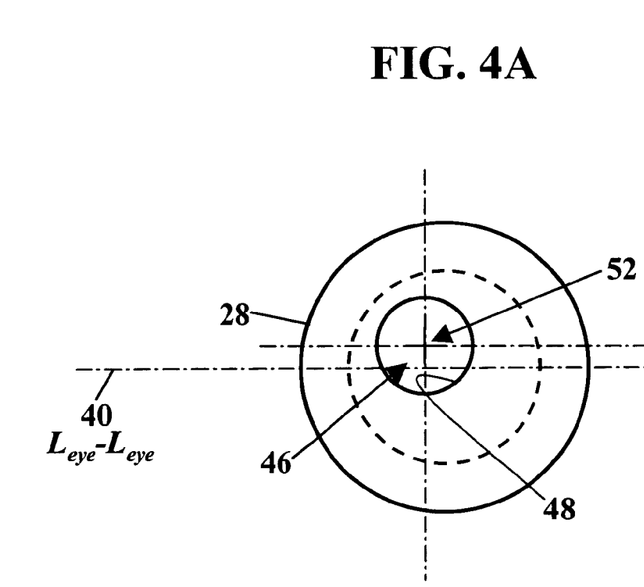
FIGS. 4A and 4B are, respectively, orthographic front and side views of an alternative design for the grommet.
Figure 4B:
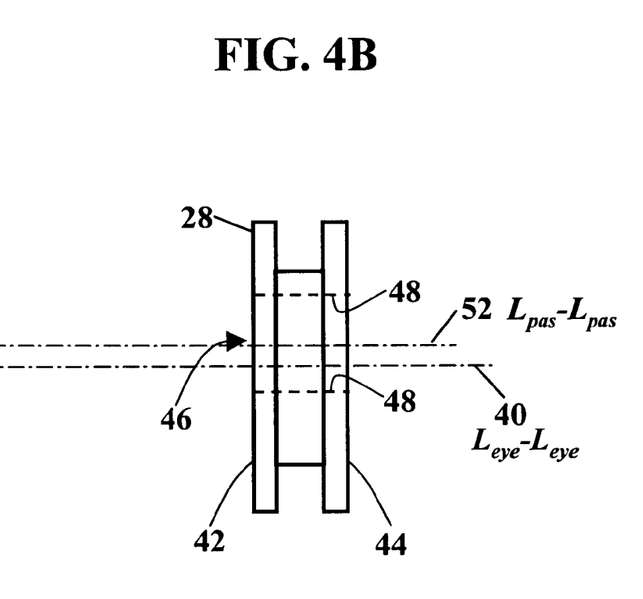

FIGS. 4A and 4B are, respectively, orthographic front and side views of an alternative design for the grommet 28. Here, however, the at least one passage 46 is not centrally located in the grommet 26. The passage axis 52 is, instead, parallel to the lateral axis 40 of the eyelet (shown as reference numeral 26 in FIG. 2). The at least one passage 46 still extends from the first side surface 42 to the second side surface 44, and the inner wall 48 still defines the passage axis 52. The at least one passage 46 is offset from the center of the grommet 28, and this configuration provides more options when routing the communication cable within the framework of the drop ceiling.

Figure 5A:
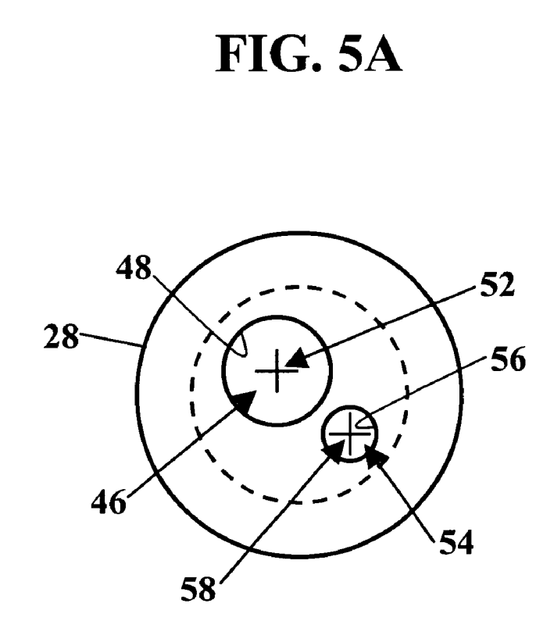
FIGS. 5A and 5B are orthographic front views of other alternative designs for the grommet.
Figure 5B:
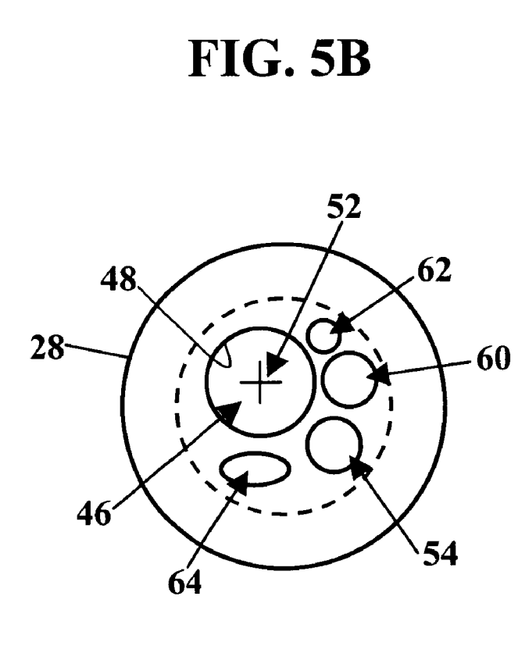

FIGS. 5A and 5B are orthographic front views of other alternative designs for the grommet 28. FIGS. 5A and 5B illustrate that the grommet 28 may have more than one passage. FIG. 5A, for example, shows the passage 46 and a second passage 54. The second passage 54 has an inner wall 56 that defines a second passage axis 58. The second passage 54 is shown having a smaller diameter than the passage 46, yet the second passage could alternatively have a larger diameter. FIG. 5B illustrates that the grommet 28 may have any number of passages, including a third passage 60, a fourth passage 62, and a fifth passage 64. The third passage 60, the fourth passage 62, and the fifth passage 64 would each have a corresponding inner wall, and each corresponding inner wall would define an axis for each additional passage. These axes however, are not shown to help keep the drawing simple. FIG. 5B also shows that the diameter of each passage 46, 54, 60, 62, and 64 may be different depending upon the diameter of a communication cable passing through each passage. Each passage, if desired, may have a non-circular cross-section, such as the oval-shaped fifth passage 64.

Figure 6A:
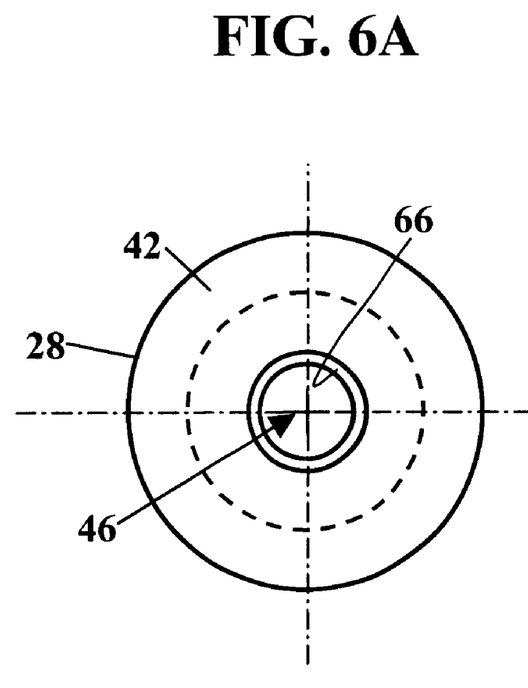
FIGS. 6A and 6B are, respectively, orthographic front and side views of still another alternative design for the grommet.
Figure 6B:
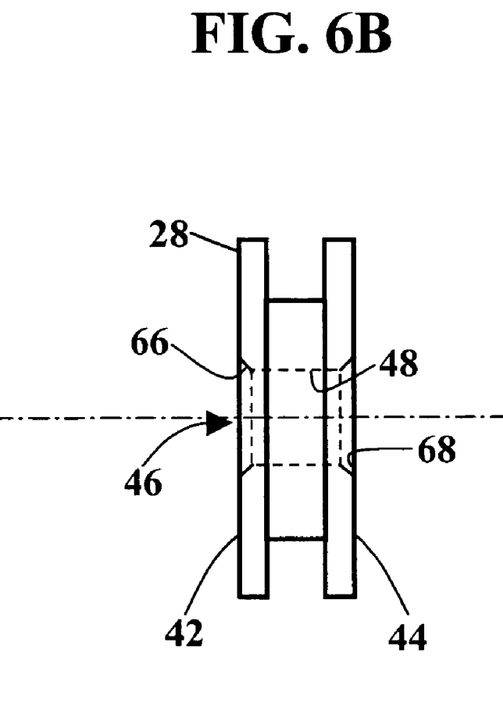

FIGS. 6A and 6B are, respectively, orthographic front and side views of still another alternative design for the grommet 28. Here the at least one passage 46 includes chamfers 66 and 68. The first surface 42 of the grommet 28 includes the chamfer 66, while the second side surface 44 includes the chamfer 68. The chamfers 66 and 68 help guide the communication cable as the communication cable is inserted into and through the passage 46. If the grommet 28 has more than one passage, any of the passages could have a chamfer on either side surface.

Figure 7A:
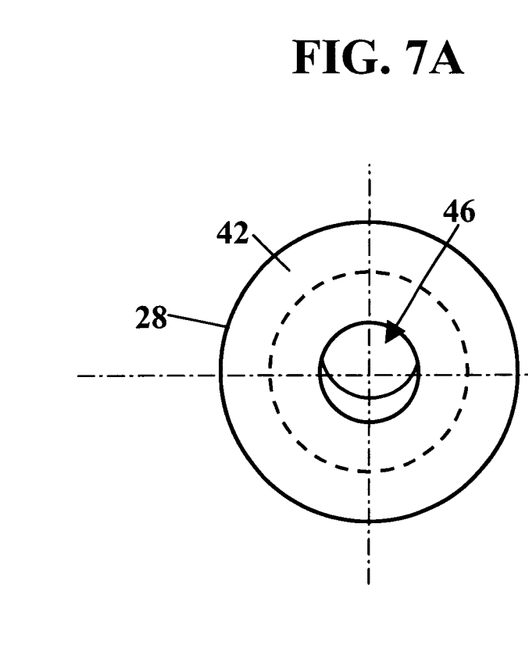
FIGS. 7A and 7B are, respectively, orthographic front and side views of yet another alternative design for the grommet.
Figure 7B:
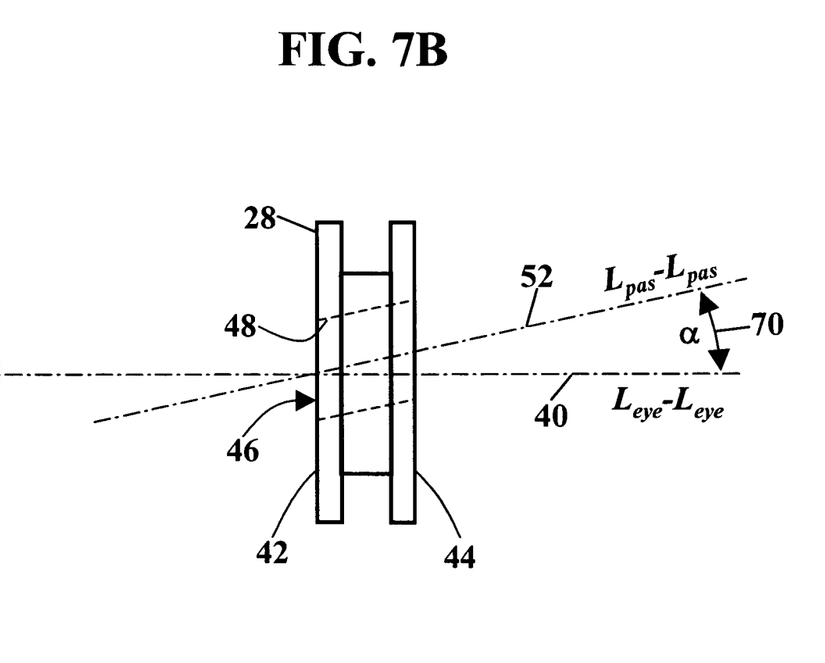

FIGS. 7A and 7B are, respectively, orthographic front and side views of yet another alternative design for the grommet 28. The at least one passage 46 extends from the first side surface 42 to the second side surface 44, and the at least one passage 46 is bound by the inner wall 48. FIGS. 7A and 7B, however, show the passage axis 52 oriented at an angle a (shown as reference numeral 70) to the lateral axis 40 of the eyelet (shown as reference numeral 26 in FIG. 2). The angle a is preferably between $0° \leq \alpha \leq 90°$, more preferably between $0° \leq \alpha \leq 45°$, and most preferably between $15° \leq \alpha \leq 45°$. Because the passage 52 may be oriented in relation to the eyelet, grommets may be manufactured with differing orientations between the lateral axis 40 of the eyelet and the passage axis 52. As a technician routs the communication cable within the drop ceiling, the technician may then choose from a variety of grommets with varying passage orientations. These varying orientations, between the lateral axis 40 of the eyelet and the passage axis 52, help the technician select and maintain the desired routing of the communication cable within the drop ceiling.

Figure 8A:
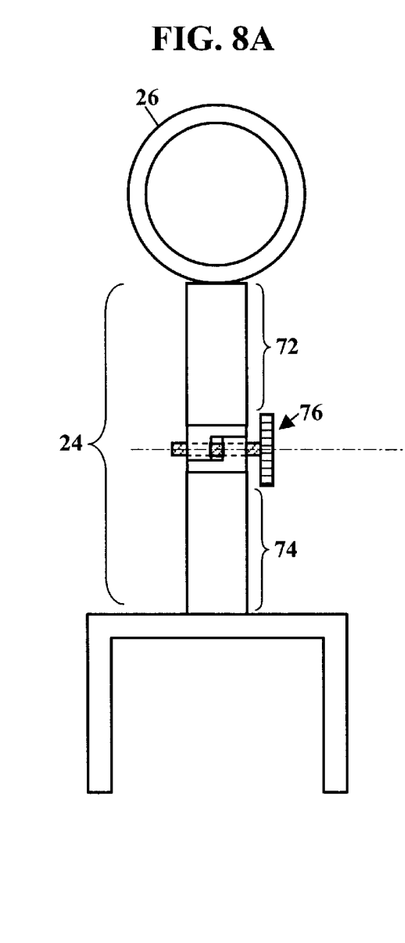
FIG. 8 is a series of schematics showing an alternative design for a main body of the apparatus.
Figure 8B:
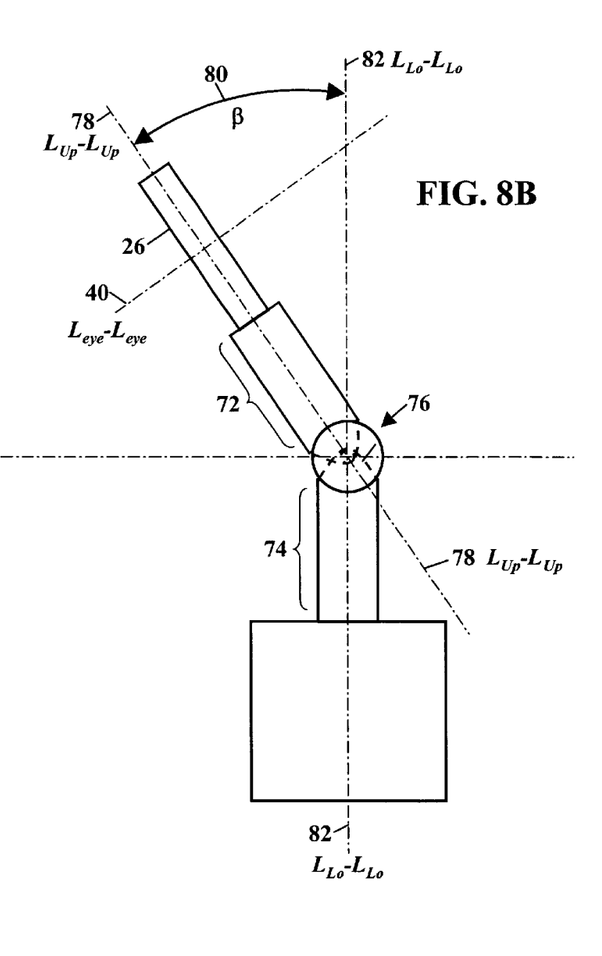

FIG. 8 is a series of schematics showing an alternative design for the main body 24. FIG. 8A is an orthographic front view of the main body 24, while FIG. 8B is an orthographic side view. This alternative design has an upper portion 72 of the main body 24 hinged to a lower portion 74. The upper portion 72 is attached to the eyelet 26. The orientation of the upper portion 72, and thus the eyelet 26, may be adjusted in relation to the lower portion 74. A hinge 76 joins the upper portion 72 to the lower portion 74. As FIG. 8B shows, the hinge 76 allows an upper longitudinal axis $L_{Up}$—$L_{Up}$ (shown as reference numeral 78) to be oriented at an angle β (shown as reference numeral 80) in relation to a lower longitudinal axis $L_{Lo}$—$L_{Lo}$ (shown as reference numeral 82). This alternative design for the main body 24 permits the orientation of the upper portion 72, and thus the eyelet 26, to be adjusted in relation to the lower portion 74. The angle β is preferably between $0° \leq \beta \leq 90°$, more preferably between $0° \leq \beta \leq 60°$, and most preferably between $0° \leq \beta \leq 45°$. Because the upper portion 72 may be oriented in relation to the lower portion 74, a technician may choose from a variety of orientations for the upper portion 72, and thus the lateral axis 40 of the eyelet 26, when routing the communication cable. These varying orientations further help the technician select and maintain the desired routing of the communication cable within the drop ceiling.

Figures 9A, 9B:
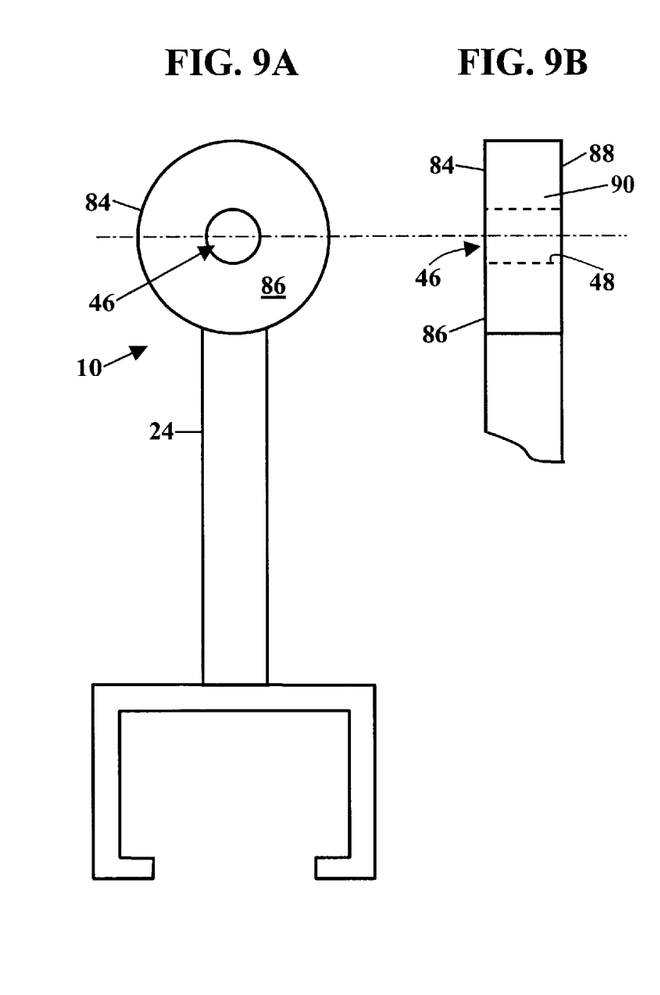
FIGS. 9A, 9B, and 9C are, respectively, an orthogonal front view, a partial, orthogonal side view, and a partial, orthogonal front view of an alternative design for the apparatus.

FIGS. 9A and 9B are, respectively, an orthogonal front view and a partial, orthogonal side view of an alternative design for the apparatus 10. Here the apparatus 10 has an integral, molded construction that eliminates the separate grommet (shown as reference numeral 28 in FIGS. 2–7). The main body 24 has a head portion 84. The head portion 84 includes the at least one passage 46 through which the communication cable passes. The at least one passage 46 extends from a first side surface 86 of the head portion 84 to an opposite, second side surface 88. The passage 46 is bound by the inner wall 48 in an interior region 90 of the head portion 84.

Figure 9C:
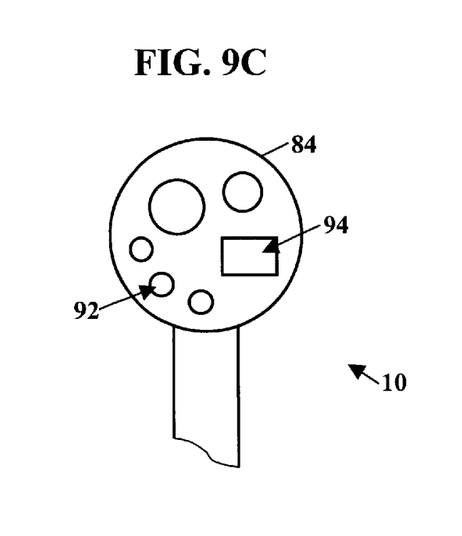

FIG. 9C is a partial, orthogonal front view of still another alternative design for the apparatus 10. Here the head portion 84 includes at least two (2) passages 92 and 94. The at least two passages 92 and 94 may have any diameter sized to accommodate various sizes of communication cables. As FIG. 9C illustrates, the head portion 84 may have any number of passages, and each passage may have a differing cross-section. Each passage, too, may be oriented at an angle a (shown as reference numeral 70) to the lateral axis 40 of the eyelet (shown, respectively, as reference numerals 70 and 40 in FIG. 7B). The main body 24, likewise, may have an upper portion hinged to a lower portion as shown and as described with reference to FIGS. 8A and 8B.

Figure 10:
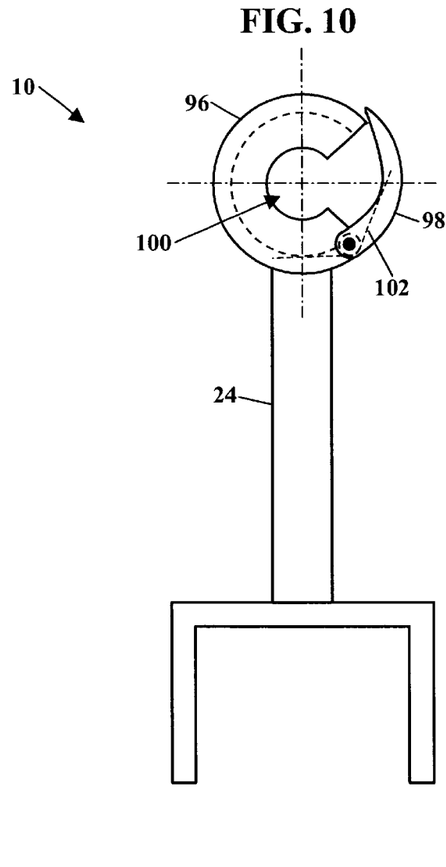
FIG. 10 is an orthogonal front view of a further embodiment of the apparatus.

FIG. 10 is an orthogonal front view of a further embodiment of the apparatus 10. FIG. 10 shows a "C"-shaped eyelet 96. The "C"-shaped eyelet 96 includes a hinged gate 98 for accessing an interior passage 100. The technician swings open the hinged gate 98 and inserts the communication cable into the interior passage 100. This "C"-shaped eyelet 96 is especially useful when new communication cables are routed alongside, or in pace of, previously installed communication cables. A spring 102 restores the hinged gate 98 to a closed position and helps retain the communication cables within the interior passage 100.

Figure 11A:
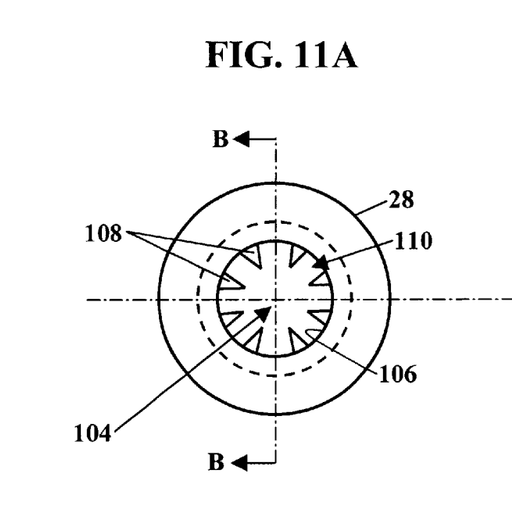
FIG. 11 is a series of schematics showing yet another alternative design for the grommet.
Figure 11B:
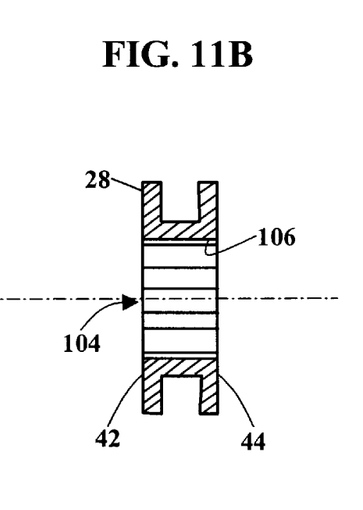
Figure 11C:
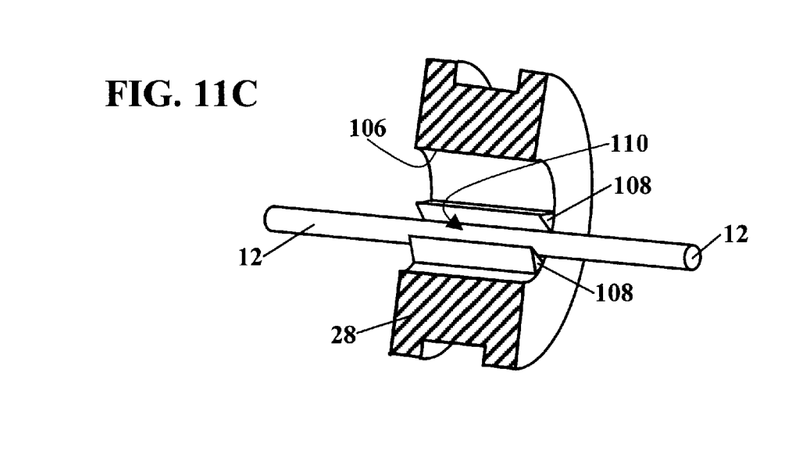

FIG. 11A is an orthographic front view of yet another alternative design for the grommet 28. FIG. 11B is a sectional view taken along Line B—B of FIG. 11A, while FIG. 11C is an isometric sectional view also taken along Line B—B. Here the grommet 28 has a bore 104 through which at least one communication cable passes. The bore 104 extends from the first side surface 42 to the second side surface 44 and the bore 104 is bounded by an inner wall 106. The bore 104 also includes means for retaining a position of the communication cable within the bore 104. At least one pair of tabs 108 extends from the inner wall 106. As FIG. 11C best shows, the at least one pair of tabs 108 are circumferentially-spaced along the inner wall 106 such that the communication cable press-fits into a channel 110 between the pair of tabs 108. Because the communication cable press-fits into the channel 110, the pair of tabs 108 retains the position of the communication cable within the bore 104. A technician inserts the communication cable 12 into and through the bore 104 and then presses the communication cable into an available channel 110. The pair of tabs 108 retains the communication cable 12 and helps maintain the desired routing of the communication cable within the drop ceiling.

Figure 12:
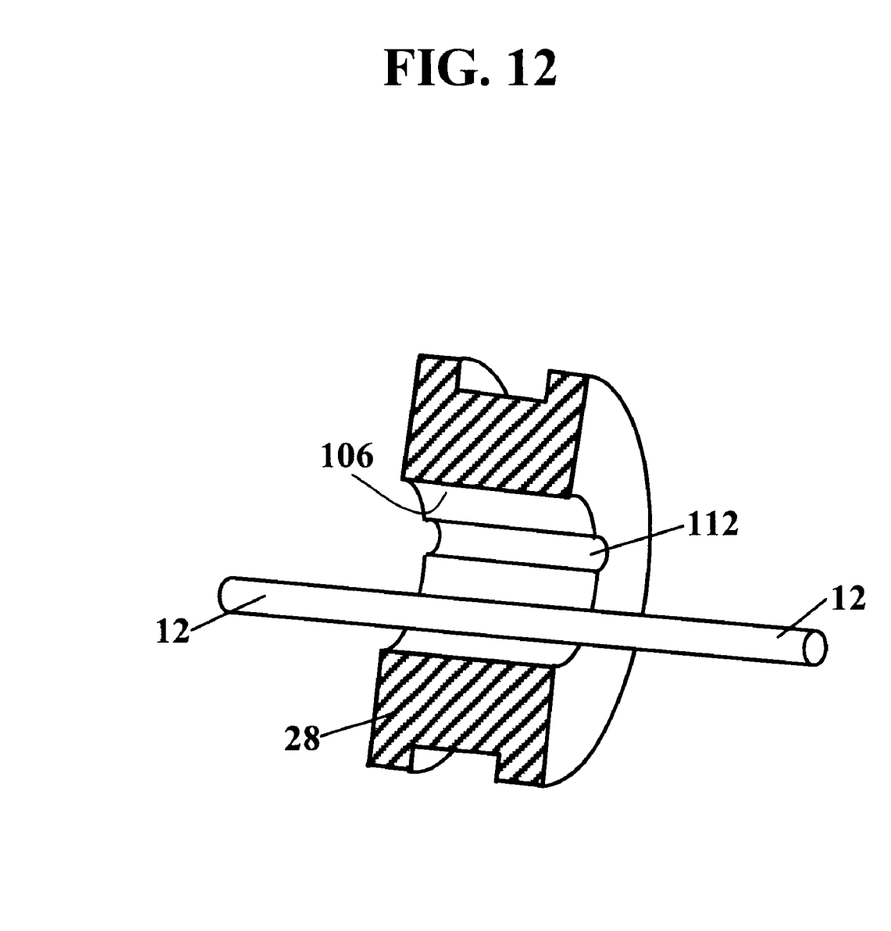
FIG. 12 is an isometric sectional view of still another alternative design for the grommet.

FIG. 12 is an isometric sectional view taken along Line B—B of FIG. 11A. FIG. 12, however, shows an alternate means for retaining the position of the communication cable 12 within the bore 104. At least one notch 112 is formed in the inner wall 106 of the bore 104. The at least one notch 112 is sized such that the communication cable 12 press-fits into the notch 112. The at least one notch 112 again retains the communication cable 12 and helps maintain the desired routing of the communication cable within the drop ceiling.

The apparatus 10, as mentioned earlier, secures to the framework of the drop ceiling. As FIG. 2 shows, the apparatus includes means 30 for securing the apparatus to the framework of the drop ceiling. A threaded thumbscrew 114 allows the technician to slide the apparatus 10 over the framework and tighten the thumbscrew 114 against the framework. The thumbscrew 114 thus clamps the apparatus 10 to the framework. The threaded thumbscrew 114 permits the technician to quickly and to easily secure the apparatus without drilling holes in the framework of the drop ceiling. One alternative means for securing the apparatus includes a threaded bolt and nut clamping the apparatus 10 to the framework. The bolt would insert into and through a hole in the apparatus, and the nut and bolt would then clamp the apparatus to the framework. The threaded bolt may even insert into and through a hole in the framework of the drop ceiling.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. An apparatus, comprising:
   a main body having a first end, a second end, and a longitudinal axis;

the main body also having an eyelet at the first end, the eyelet defining a lateral axis for the eyelet;

a grommet disposed within the eyelet, the grommet having a first side surface and an opposite second side surface, the first side surface and the second side surface perpendicular to the lateral axis of the eyelet;

the grommet also having a bore through which at least one communication cable passes, the bore extending from the first side surface to the second side surface, the bore including means for retaining a position of the communication cable within the bore;

a pair of tabs for retaining the position of the communication cable within the bore, the pair of tabs extending from the inner wall of the bore, the pair of tabs circumferentially-spaced along the inner wall of the bore to form a channel between the tabs, the channel sized such that the communication cable press-fits into the channel; and means for securing the apparatus to a framework of a drop ceiling, wherein the communication cable passes through the bore in the grommet and the pair of tabs extending from the inner wall of the bore helps maintain a desired routing of the communication cable once routed through the bore.

2. An apparatus according to claim 1, wherein the apparatus comprises at least two pairs of tabs extending from the inner wall of the bore.

3. An apparatus according to claim 1, wherein the apparatus comprises at least three tabs extending from the inner wall of the bore.

* * * * *